United States Patent
Mellara et al.

(10) Patent No.: US 9,333,809 B2
(45) Date of Patent: May 10, 2016

(54) TREAD STRIP WITH GROOVES FEATURING NOISE-REDUCING MEANS

(75) Inventors: Beatrice Mellara, Rome (IT); Marco Ballatore, Bertinoro (IT); Carlo Fabrizi, Rome (IT)

(73) Assignee: BRIDGESTONE CORPORATION, Tokyo (JP)

( * ) Notice: Subject to any disclaimer, the term of this patent is extended or adjusted under 35 U.S.C. 154(b) by 798 days.

(21) Appl. No.: 13/641,630

(22) PCT Filed: Apr. 20, 2011

(86) PCT No.: PCT/IB2011/000864
§ 371 (c)(1),
(2), (4) Date: Jan. 25, 2013

(87) PCT Pub. No.: WO2011/132064
PCT Pub. Date: Oct. 27, 2011

(65) Prior Publication Data
US 2013/0112326 A1    May 9, 2013

(30) Foreign Application Priority Data
Apr. 20, 2010  (IT) ............................. TO2010A0325

(51) Int. Cl.
*B60C 11/13*     (2006.01)
(52) U.S. Cl.
CPC ......... *B60C 11/13* (2013.01); *B60C 2011/1338* (2013.04)
(58) Field of Classification Search
CPC .............. B60C 19/002; B60C 2011/1338; B60C 2011/1361; B60C 11/1369; B60C 11/13
USPC ............... 152/209.2, 209.3, 209.19, 209.21, 152/209.22
See application file for complete search history.

(56) References Cited

U.S. PATENT DOCUMENTS

| | | | | |
|---|---|---|---|---|
| 2001/0032691 | A1* | 10/2001 | Ohsawa | 152/209.18 |
| 2008/0078487 | A1* | 4/2008 | Ohara | 152/209.19 |

FOREIGN PATENT DOCUMENTS

| | | |
|---|---|---|
| JP | H0699705 A | 4/1994 |
| JP | 9-002020 A | 1/1997 |
| JP | H10905 A | 1/1998 |
| JP | 2006-137231 A | 6/2006 |
| JP | 2007001434 A | 1/2007 |
| JP | 2008037139 A | 2/2008 |
| JP | 2010042695 A | 2/2010 |
| WO | 2009/053353 A1 | 4/2009 |

OTHER PUBLICATIONS

JP 6-99705, Apr. 1994, English language machine translation, Japan Platform for Patent Information [https://www4.j-platpat.inpit.go.jp/eng/tokujitsu/tkbs_en/TKBS_EN_GM101_Top.action].*
Communication dated Apr. 14, 2015 from the Japanese Patent Office in counterpart application No. 2013-505564.

* cited by examiner

*Primary Examiner* — Eric Hug
(74) *Attorney, Agent, or Firm* — Sughrue Mion, PLLC

(57) ABSTRACT

A tread strip made of at least one rubber-based material, and having at least one longitudinal groove bounded by a bottom wall and by two lateral walls on opposite sides of the bottom wall; wherein a number of pins seamlessly project from at least one of the walls of the longitudinal groove, and are made of the same rubber-based material than the tread strip.

26 Claims, 17 Drawing Sheets

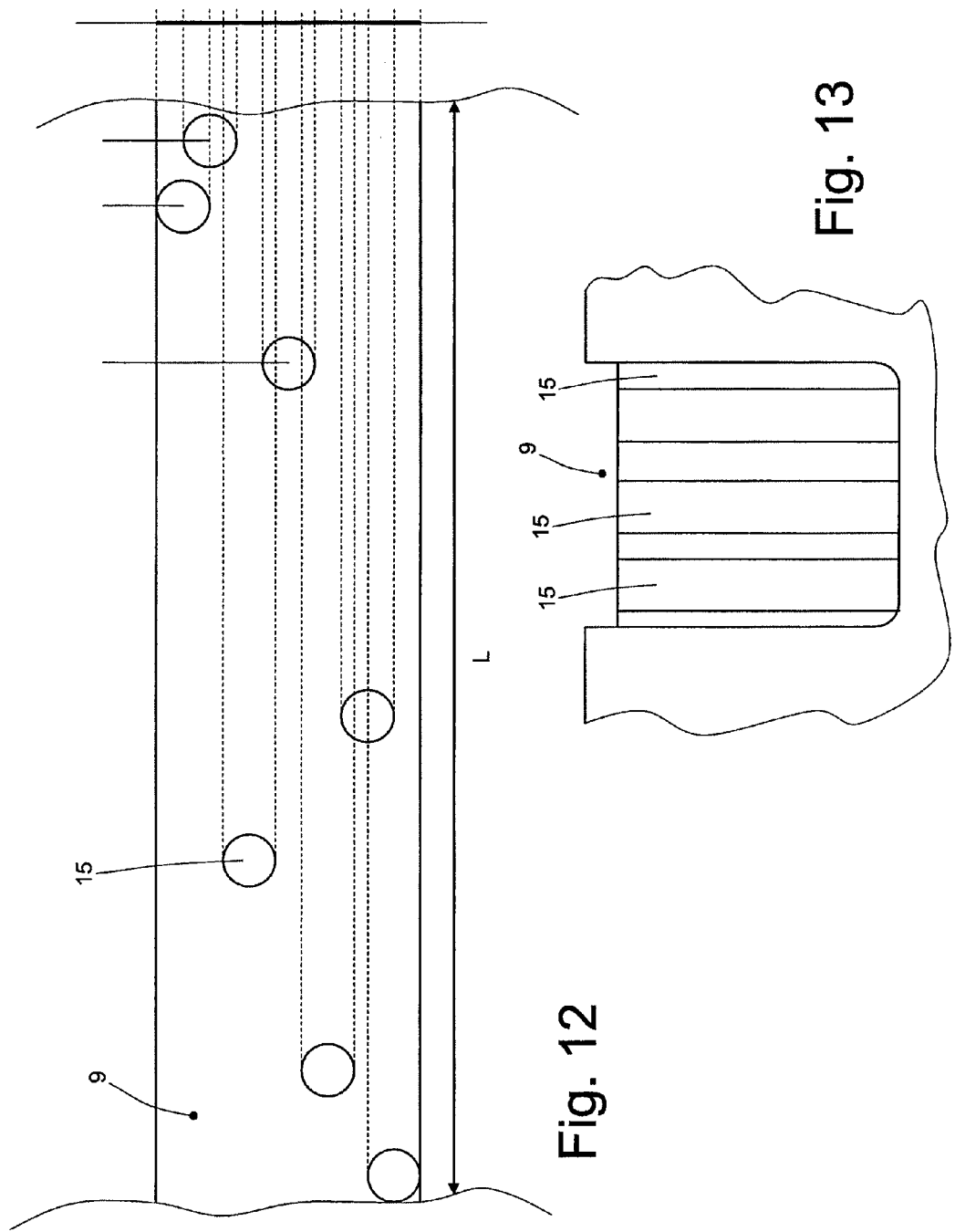

TREAD STRIP WITH GROOVES FEATURING NOISE-REDUCING MEANS

CROSS REFERENCE TO RELATED APPLICATIONS

This application is a National Stage of International Application No. PCT/IB2011/000864 filed Apr. 20, 2011, claiming priority based on Italian Patent Application No. TO2010A000325 filed Apr. 20, 2010, the contents of all of which are incorporated herein by reference in their entirety.

TECHNICAL FIELD

The present invention relates to a tread strip with grooves featuring noise-reducing means.

BACKGROUND ART

Future tyre certification standards are expected to call for a reduction in the maximum noise level produced as the tyre rolls along the road surface; which means steps must be taken forthwith to reduce such noise.

Patent Application WO2009053353A1 describes a low-noise tyre, in which the tread strip grooves contain fine (therefore highly flexible) threads of 20-80 micron in diameter, and made of material (nylon, PET, acrylic, cotton, linen, wool or rayon) other than the rubber from which the tread strip is made. The threads inside the grooves have a fairly high density (2-50 threads/mm$^2$) and serve to prevent the formation inside the grooves of stationary pressure waves resulting in noise emissions in the audible range (roughly between 1 and 4 kHz).

The threads described in Patent Application WO2009053353A1, however, are extremely complicated (therefore, expensive) to produce, by having to attach to the tread rubber a large number of fine threads of material (normally plastic) different from that of the tread. Moreover, attachment of the threads to the tread rubber must be mechanically strong enough to withstand the stress produced, as the tyre rolls along the road surface, by the centrifugal force generated by rotation and deformation of the tread at the point contacting the road surface. As the tyre rolls, the threads in the tread strip grooves also tend to get entangled in uneven road surfaces and so ripped out from the tread strip.

Patent Application JP9002020 describes a low-noise tyre, in which the longitudinal grooves in the tread strip contain noise-reducing pins projecting from the lateral walls of the grooves to a maximum length of 0.5 to 3.0 mm.

Patent Application JP2006137231 describes a tyre, in which the lateral longitudinal grooves in the tread strip contain pins projecting from the lateral walls of the grooves to a maximum length of 0.5 to 3.0 mm.

DESCRIPTION OF THE INVENTION

It is an object of the present invention to provide a tread strip with grooves featuring noise-reducing means, which strip is designed to eliminate the above drawbacks, and in particular is cheap and easy to produce.

According to the present invention, there is provided a tread strip with grooves featuring noise-reducing means, as claimed in the attached Claims.

BRIEF DESCRIPTION OF THE DRAWINGS

A number of non-limiting embodiments of the present invention will be described by way of example with reference to the accompanying drawings, in which:

FIG. 12 shows a schematic, larger-scale plan view of a footprint-length portion of a longitudinal groove of the FIG. 1 tyre tread strip;

FIG. 13 shows a schematic side view of the FIG. 12 longitudinal groove portion;

PREFERRED EMBODIMENTS OF THE INVENTION

Figure 1:
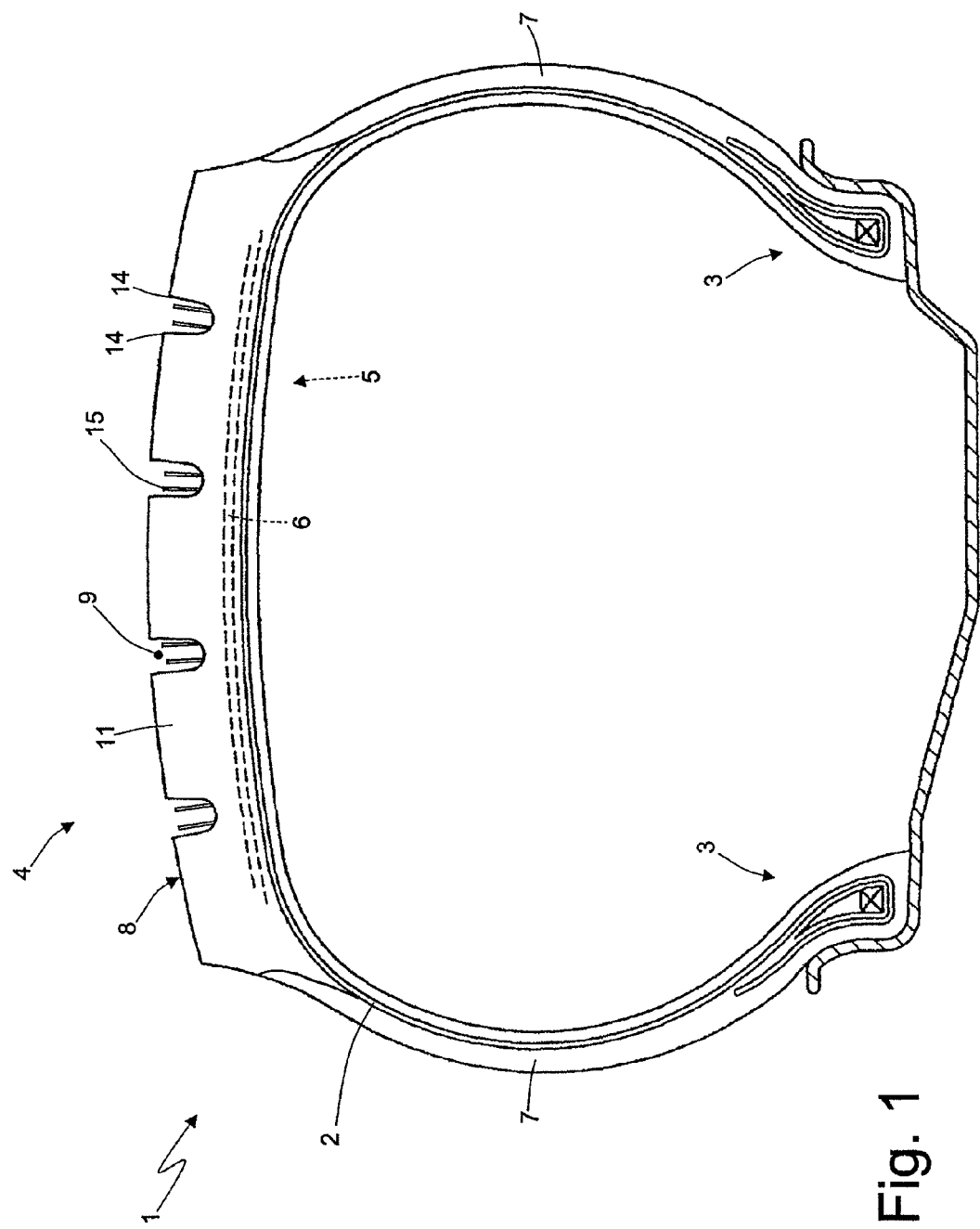
FIG. 1 shows a schematic side section of part of a tyre featuring a tread strip in accordance with the present invention.

Number 1 in FIG. 1 indicates as a whole a tyre comprising a toroidal body ply 2 having two annular beads 3 and supporting a tread strip 4 made of cured-rubber-based material. A tread belt 5, comprising two tread plies 6, is interposed between body ply 2 and tread strip 4; and each tread ply 6 comprises a rubber strip, in which side by side cords (not shown) are embedded a given distance apart and at a given angle to the equatorial plane of tyre 1. Body ply 2 also supports two sidewalls 7 between tread strip 4 and beads 3.

Figure 2:
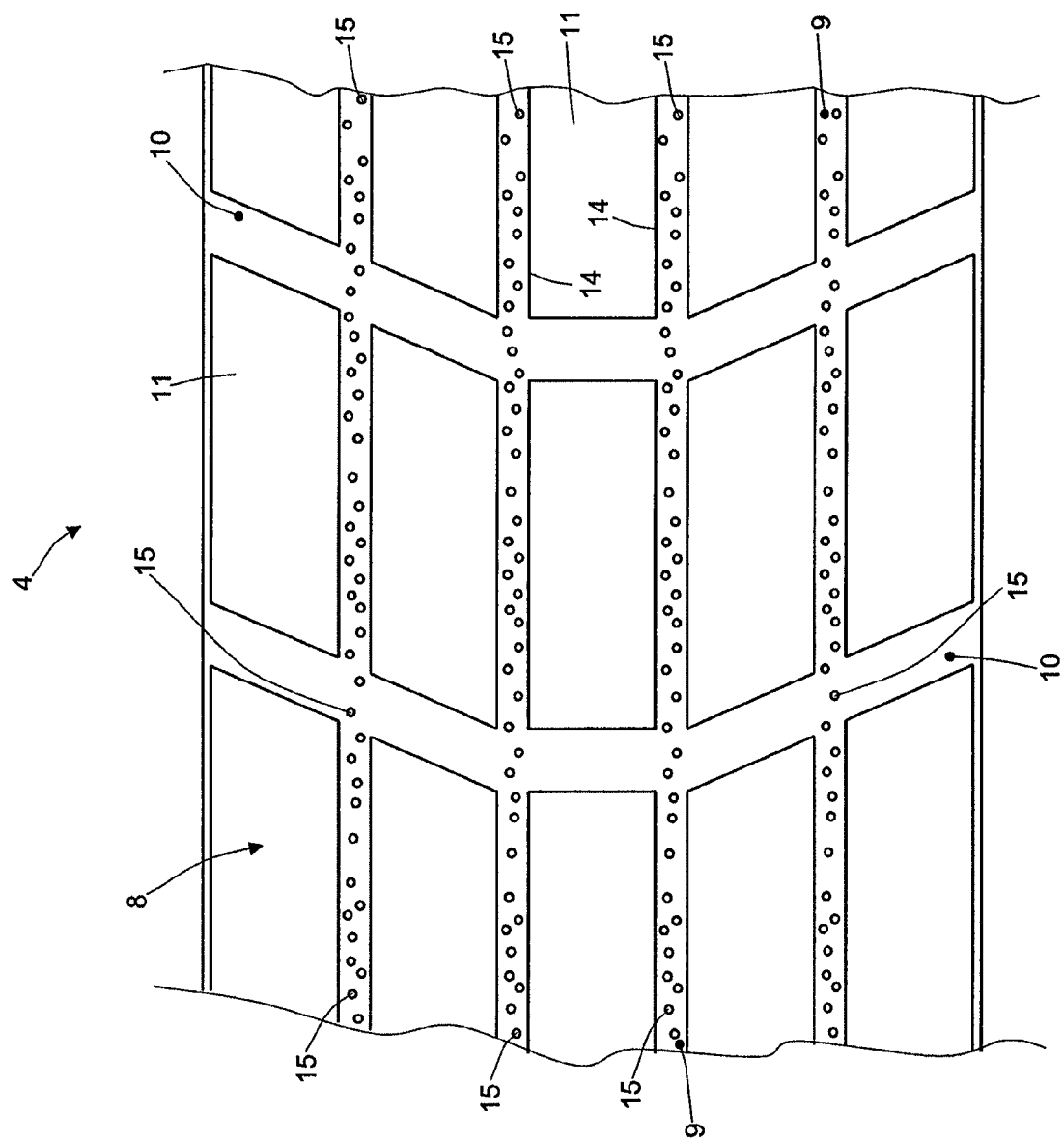
FIG. 2 shows a schematic, larger-scale plan view of a portion of the FIG. 1 tyre tread strip.

As shown more clearly in FIG. 2, tread strip 4 has a rolling surface 8, which bounds tread strip 4 externally (i.e. is located radially outwards), rests on the road surface in use, and in which is formed a raised pattern comprising a number of longitudinal or circumferential grooves 9 (i.e. extending crosswise to the rotation axis, and along the circumference, of tyre 1), and a number of transverse grooves 10 (i.e. parallel to the rotation axis of tyre 1 and perpendicular to longitudinal grooves 9). Longitudinal grooves 9 and transverse grooves 10 form five longitudinal rows of blocks 11, in which each block 11 projects radially from tread strip 4, is substantially parallelepiped-shaped with a rectangular or trapezoidal cross section, and is bounded laterally by grooves 9 and 10.

Figure 3:
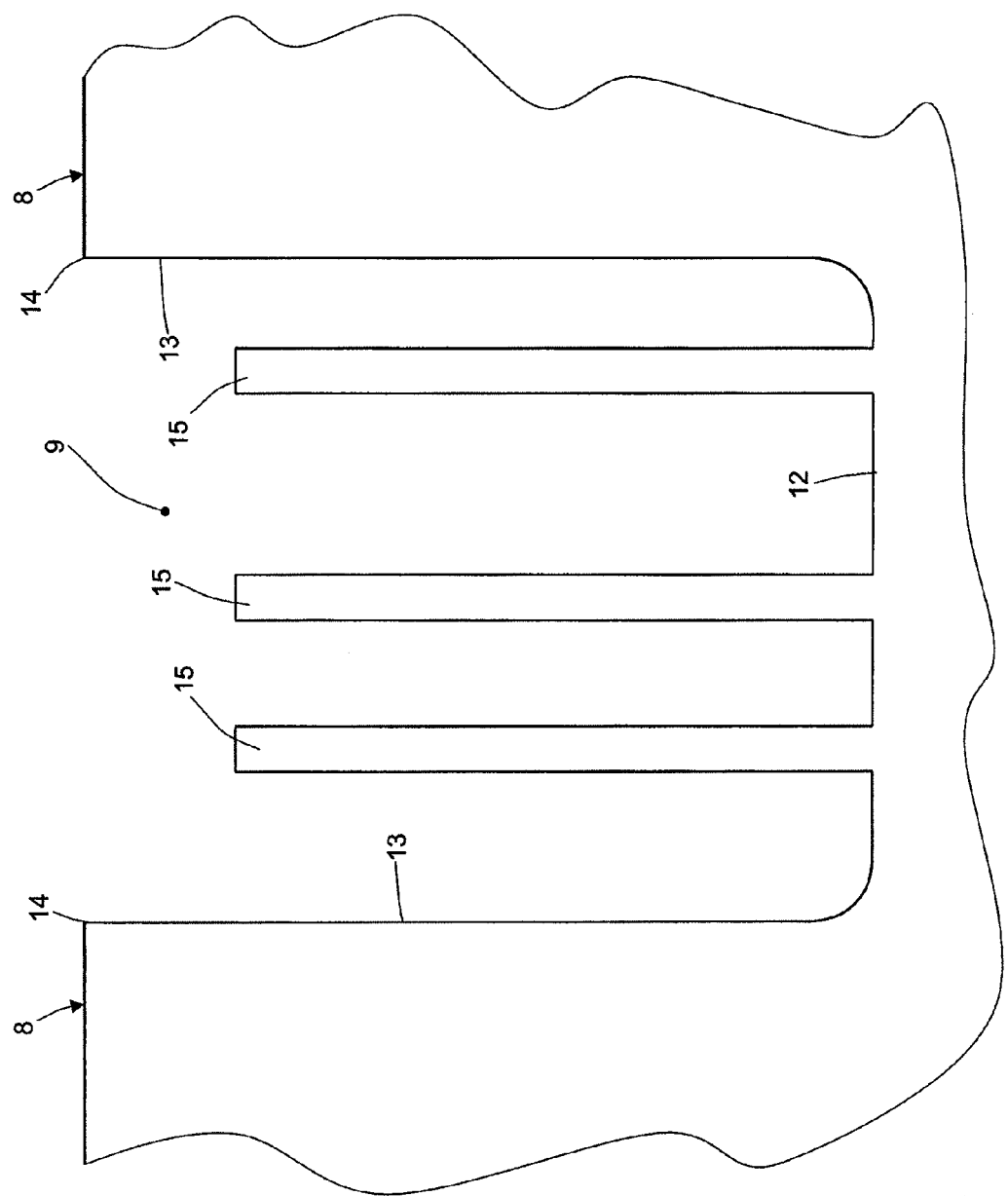
FIG. 3 shows a schematic, larger-scale cross section of a longitudinal groove of the FIG. 1 tyre tread strip.

As shown in FIG. 3, each groove 9, 10 is bounded by a bottom wall 12; and by two lateral walls 13 located on opposite sides of bottom wall 12 and forming respective edges 14 with rolling surface 8.

Each longitudinal groove 9 has a number of pins 15, each of which extends upwards from and forms a seamless offshoot of bottom wall 12 of longitudinal groove 9, and is made seamlessly of the same rubber-based material as tread strip 4. In other words, as opposed to being a separate body inserted (i.e. incorporated) partly inside bottom wall 12, each pin 15 is an 'outgrowth' of bottom wall 12, which projects from and forms a seamless whole with bottom wall 12, so there is no connection or join between bottom wall 12 and each pin 15.

Pins 15 serve to prevent the formation inside longitudinal grooves 9 of stationary pressure waves resulting in noise emissions in the audible range (roughly between 1 and 4 kHz). In other words, by preventing the formation of stationary pressure waves in longitudinal grooves 9, pins 15 act, not as 'sound absorbers' (i.e. absorbing or shielding noise emissions), but as 'sound preventers' (i.e. preventing noise emissions by preventing orderly, i.e. audible, formation of the wave).

Tests show that pins 15 in longitudinal grooves 9 are capable of reducing total noise emission, caused by tyre 1 rolling on the road surface, by as much as 1 to 2 db.

In the FIG. 1-3 embodiment, pins 15 extend upwards from bottom wall 12 of each longitudinal groove 9. In the FIG. 4 embodiment, pins 14 project from lateral walls 13 of each longitudinal groove 9. And, in the FIG. 5 embodiment, pins 15 extend upwards from bottom wall 12, and also project from lateral walls 13 of each longitudinal groove 9.

Figure 6:
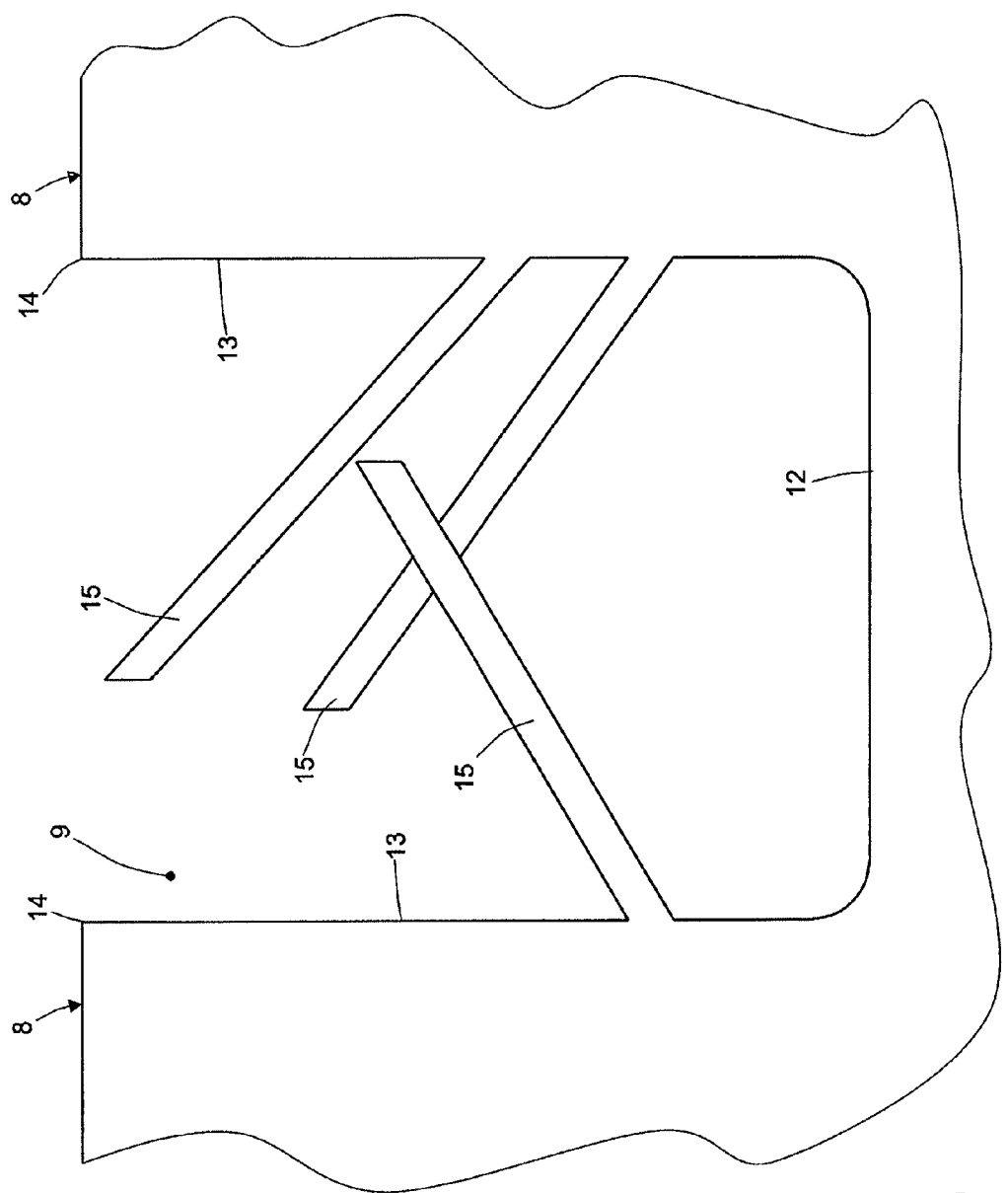

In the FIG. 6 embodiment, pins 15 extend upwards from lateral walls 13 of each longitudinal groove 9, form an angle of other than 90° with lateral walls 13 (i.e. at the point of attachment to lateral walls 13) of each longitudinal groove 9, and originate from points located between bottom wall 12 and half the total depth of longitudinal groove 9, so that, even when tread strip 4 wears down (i.e. reducing the depth of grooves 9 and 10 and the height of lateral walls 13), pins 15 still extend upwards from the unworn part of lateral walls 13.

Figure 4:
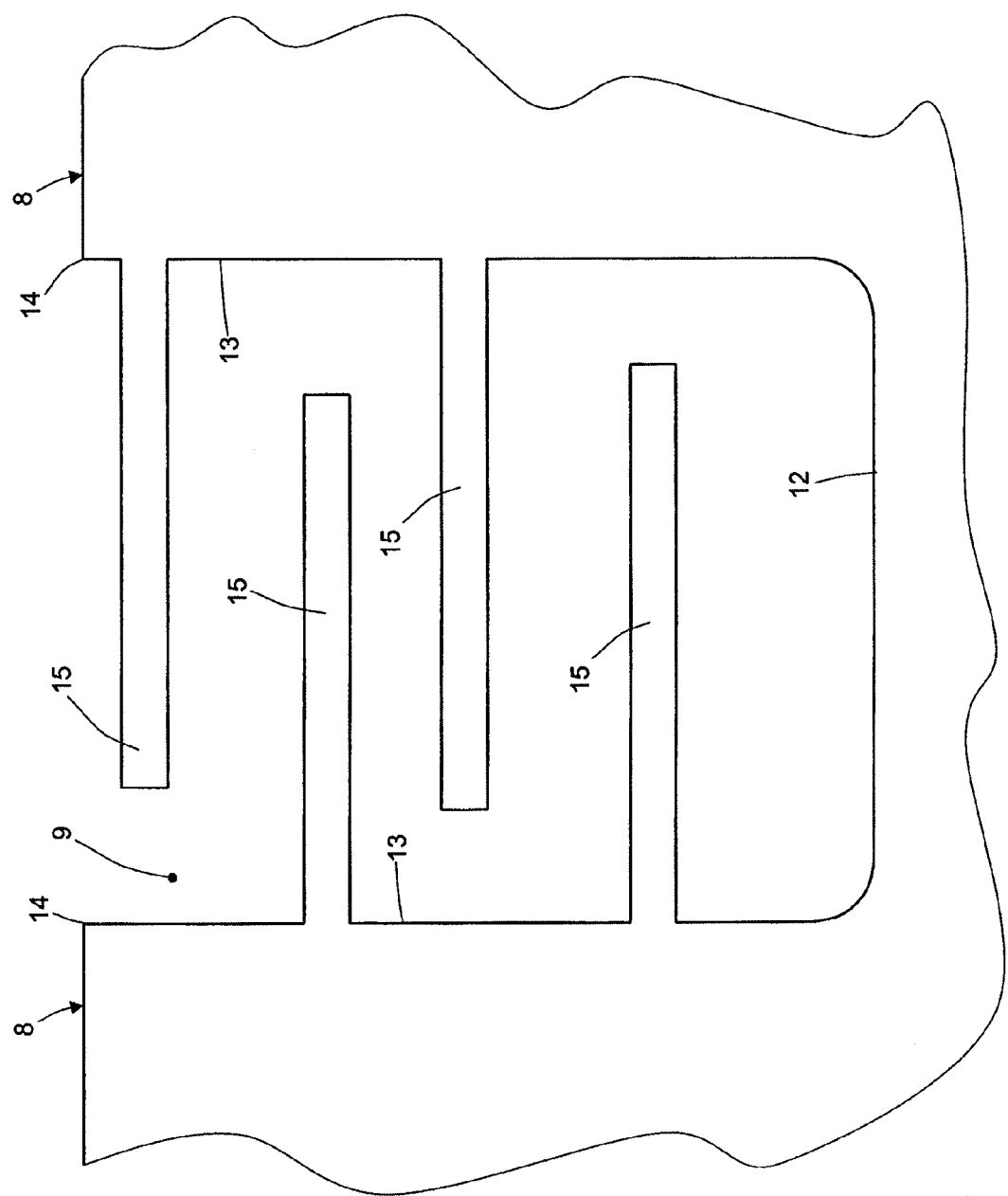
FIGS. 4-7 show schematic, larger-scale cross sections of variations of the longitudinal groove in FIG. 3.
Figure 5:
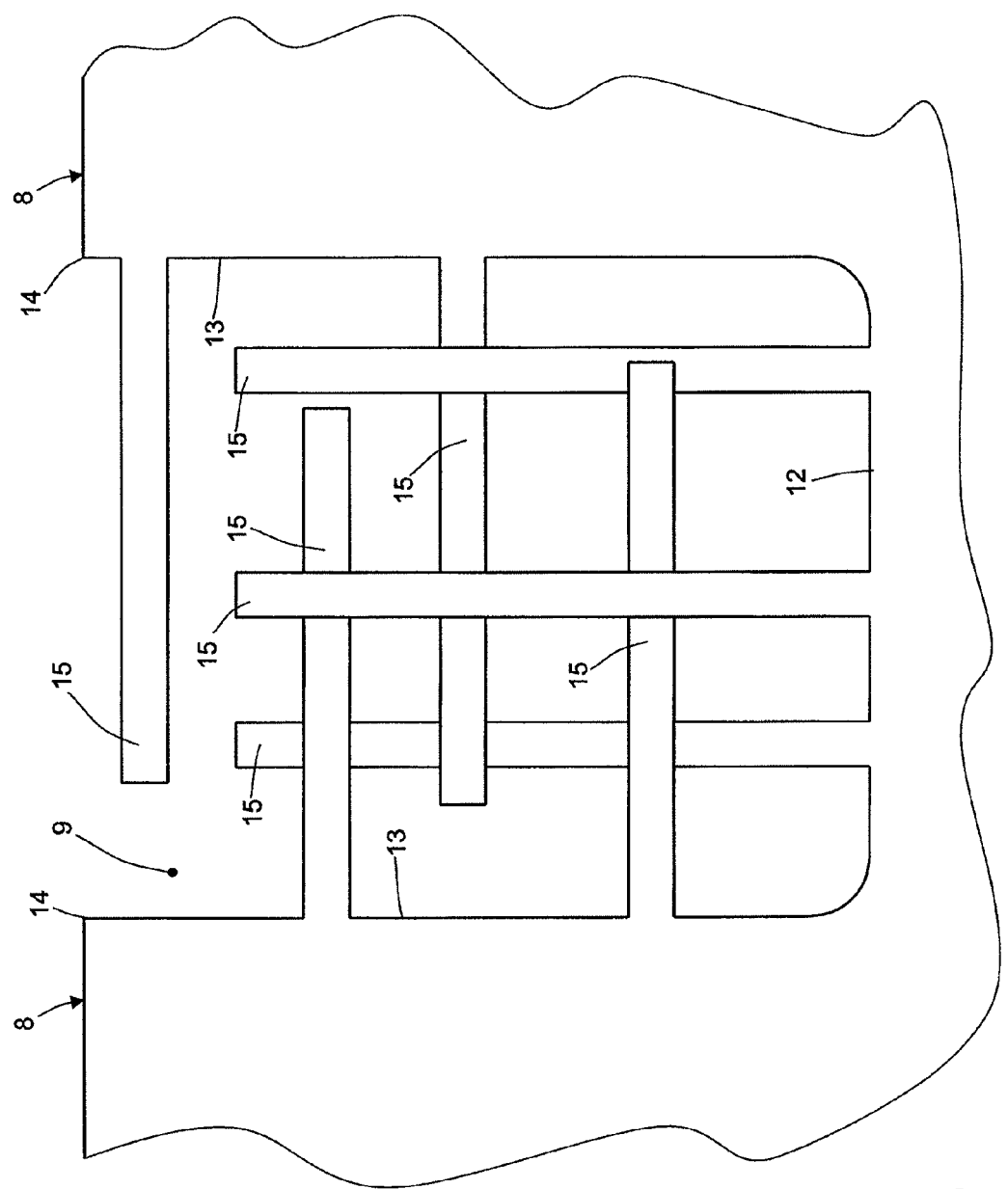

In the FIG. 3-5 embodiments, pins 15 are perpendicular to walls 12 and 13 of longitudinal groove 9. In the FIG. 6 embodiment, pins 15 form an angle of other than 90° with lateral walls 13 (i.e. at the point of attachment to lateral walls 13) of longitudinal groove 9.

In the embodiments shown in the drawings, each pin 15 has a constant cross section along its whole length. In a different embodiment not shown, each pin 15 may vary in cross section along its length, and in particular may be wider at the base attached to wall 12 or 13 (i.e. may taper away from wall 12 or 13 from which it originates).

In the embodiments shown in the drawings, each pin 15 is straight. In a different embodiment not shown, each pin 15 may be other than straight (e.g. curved, coiled, twisted, braided, . . . ).

It is important to note that each pin 15 is fully contained inside longitudinal groove 9, i.e. does not project from longitudinal groove 9 or rolling surface 8. More specifically, in a preferred embodiment, each pin 15 extending upwards from bottom wall 12 of longitudinal groove 9 is of a length equal to 60-90% of the depth of longitudinal groove 9.

Given the difficulty in producing pins 15 of different lengths, pins 15 are preferably all the same length.

The top portion of pin 15 (at least as long as tread strip 4 is not too badly worn) is thus prevented from being 'pinched' between rolling surface 8 and the road surface, which could result in pulling stress on and eventual breakage of pin 15.

In the preferred embodiment shown in the drawings, each pin 15 is roughly cylindrical, possibly tapering towards the tip, and has a circular cross section of 0.3 to 1.2 mm and preferably of 0.5 mm in diameter. Alternatively, each pin 15 may have a rectangular cross section of 0.3 to 1.2 mm in width (short side of the rectangle), and 1 to 4 mm in length (long side of the rectangle). Rectangular cross section pins 15 may be oriented longitudinally (i.e. with the long side parallel to longitudinal grooves 9, crosswise (i.e. with the long side perpendicular to longitudinal grooves 9), or at an angle (i.e. with the long side, excluding the ends, at an angle of 0-90° to longitudinal grooves 9. A further variation may comprise both circular and rectangular cross section pins 15; in which case, pins 15 of different cross sections may either be mixed, or divided into areas (i.e. areas of circular cross sections pins 15 alternating with areas of rectangular cross section pins 15).

It is important that pins 15 be distributed randomly along each longitudinal groove 9 (i.e. that the longitudinal distances between adjacent pins 15 be irregular), so that pins 15 as a whole along each longitudinal groove 9 do not form a regular structure, thus preventing undesired resonance phenomena and, hence, natural resonance frequencies at least in the audible range (i.e. between 20 Hz and 20 kHz).

Figure 10:
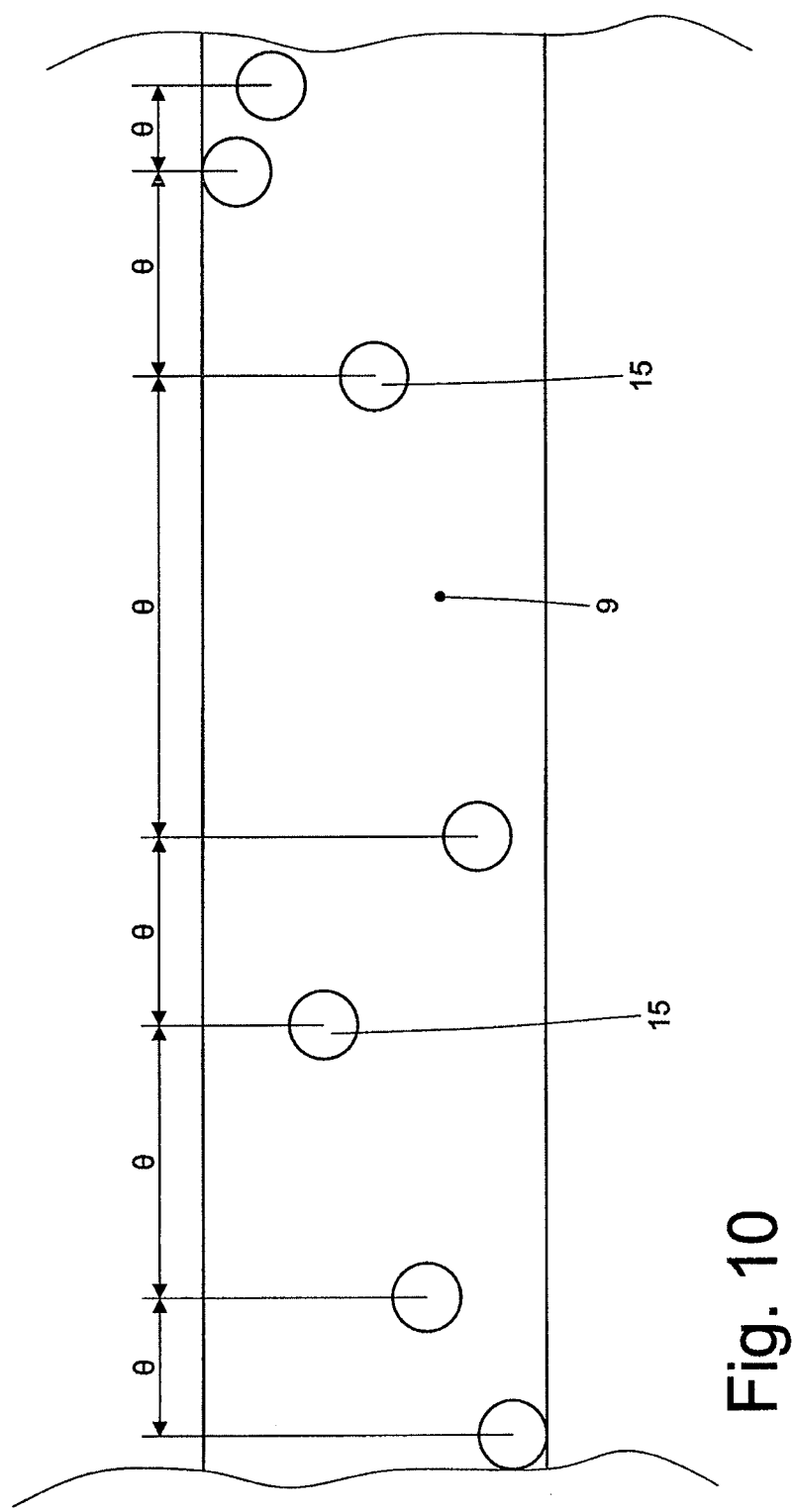
FIG. 10 shows a schematic, larger-scale plan view of part of a longitudinal groove of the FIG. 1 tyre tread strip.

In one possible embodiment shown in FIG. 10, pins 15 are distributed randomly by a random distribution of the longitudinal distances e between longitudinally consecutive pins 15, i.e. by a relatively large number of different longitudinal distances θ with no multiple/submultiple relationship. For example, assuming a longitudinal groove 9 contains a thousand (1000) pins 15, consecutive pins 15 are separated by a thousand (1000) longitudinal distances θ of a mean value (in degrees) of 0.36° (i.e. 360°/1000). If longitudinal distances θ are all equal (i.e. 0.36°), or if half of longitudinal distances θ are 0.18° (i.e. 0.36°/2), and the other half are 0.72° (i.e. 0.36°·2), this would result in a regular distribution that could easily give rise to undesired resonance phenomena. Conversely, if consecutive pins 15 are separated by numerous different unrelated longitudinal distances θ (i.e. with no multiple/submultiple relationship), this results in a random distribution that is unlikely to give rise to undesired resonance phenomena. For example, longitudinal distances θ may comprise all the distances between 0.03° and 0.80° in increments of 0.01° (i.e. 0.03°, 0.04°, 0.05° . . . 0.79°, 0.80°), with no particular longitudinal distance θ (or small number of longitudinal distances θ) occurring much more frequently than others.

Figure 11:
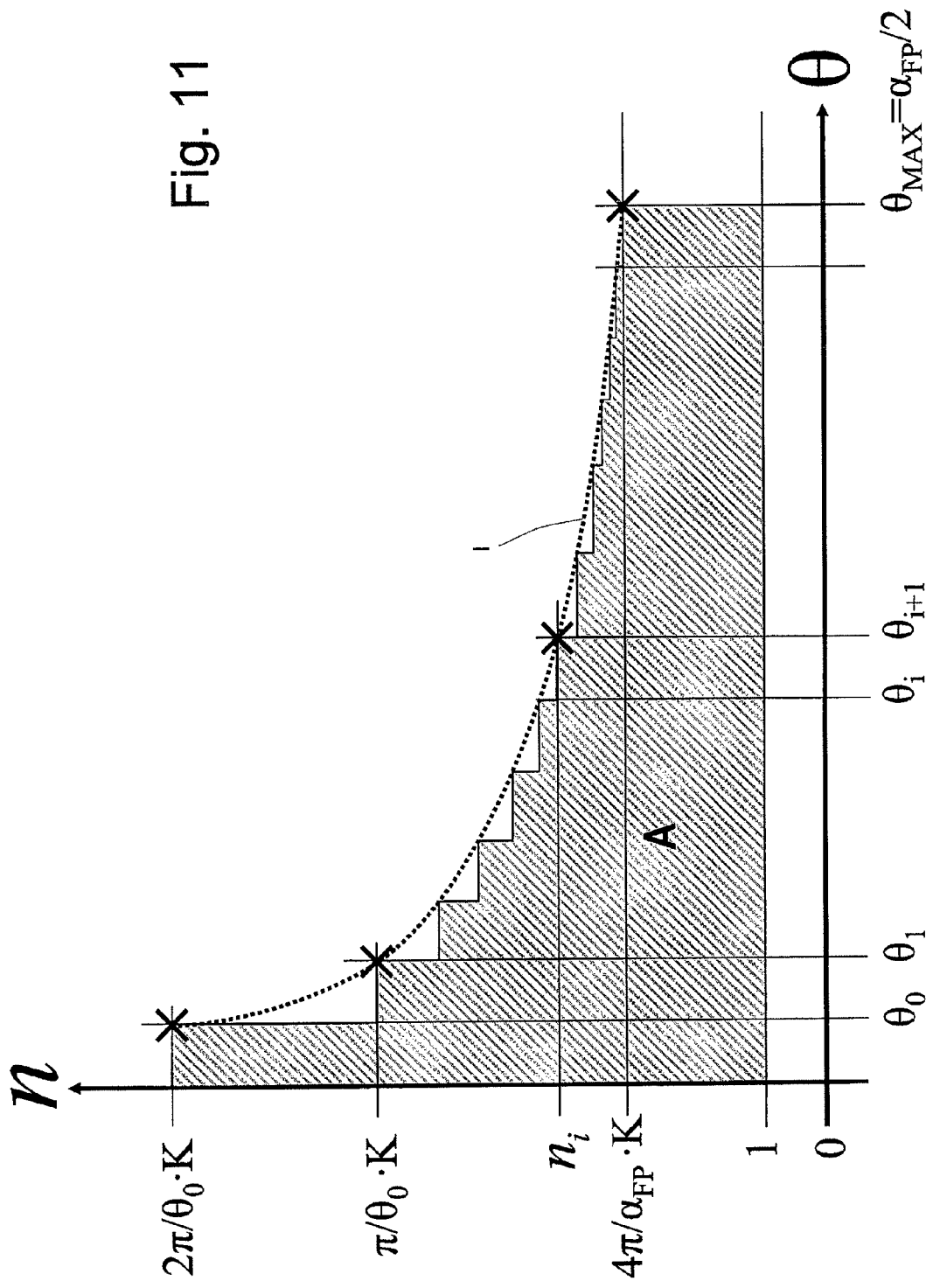
FIG. 11 shows a graph of an acceptable distribution of longitudinal distances (measured in angles) between consecutive pins.

With reference to the FIG. 11 graph, a mathematical rule can even be defined by which to determine (sufficiently) random distribution of longitudinal distances θ between consecutive pins 15. Longitudinal distances θ between consecutive pins 15 are assumed (sufficiently) randomly distributed when they have at least two occurrence frequencies n in set A (diagonally hatched portion in FIG. 11). Set A is defined by all the points, in the longitudinal distance θ/occurrence frequency n plane, between unit occurrence frequency n (i.e. n=1) and a hyperbola I, and is defined as follows:

$$\theta_0 = 2 \cdot D_{PIN}/D_{TYRE}$$

$$\theta_i = i \cdot \theta_0$$

$n_i$=occurrence between $\theta_i$ and $\theta_{i+1}$ $$A = \{n_i : n_i \epsilon [1, 2\pi/(\Theta_{i+1} \cdot K]; i=1, 2, \ldots, \alpha_{FP}/(2 \cdot \theta_0)\}$$

$D_{PIN}$ diameter of pin 15
$D_{TYRE}$ diameter of tyre 1
$\alpha_{FP}$ footprint angle
K safety coefficient greater than (1) and preferably at least two (2)

In a preferred embodiment shown in FIG. 13, in each footprint of tread strip 4 (i.e. in each footprint-long portion of tread strip 4), pins 15 in each longitudinal groove 9 are distributed so that, viewed longitudinally, pins 15 as a whole cover at least 80% (and preferably 100%) of the cross section of longitudinal groove 9. In other words, viewed longitudinally, pins 15 as a whole in each footprint-long portion of a longitudinal groove 9 cover at least 80% (and preferably 100%) of the cross section of longitudinal groove 9. That is, 'observing' a footprint-long portion of a longitudinal groove 9 from one end (as shown in FIG. 13), at least 80% (and preferably 100%) of the inside of longitudinal groove 9 is covered with pins 15.

In a preferred embodiment, pins 15 cover 0.45% to 25% of the total surface area of wall 12 or each wall 13 of longitudinal groove 9 (i.e. have a density ranging between 0.5 and 15 pins/cm$^2$). Whichever the case, pins 15 preferably occupy a volume no greater than 10% of the total volume of longitudinal groove 9. The above values ensure pins 15 are easy to produce, are highly effective in attenuating noise emissions, and, at the same time, have no appreciable effect on wet-pavement draining performance of longitudinal grooves 9.

As will be clear from the above description, each pin 15 has a relatively large diameter (roughly a few tenths of a millimeter) with respect to its length (of a few millimeters), and is made of the same rubber-based material as tread strip 4. The rubber-based material being relatively hard and rigid (to ensure an acceptable working life of tread strip 4), each pin 15 is deformable elastically, and has an undeformed shape which it springs back to and maintains when external mechanical stress is removed.

Figure 7:
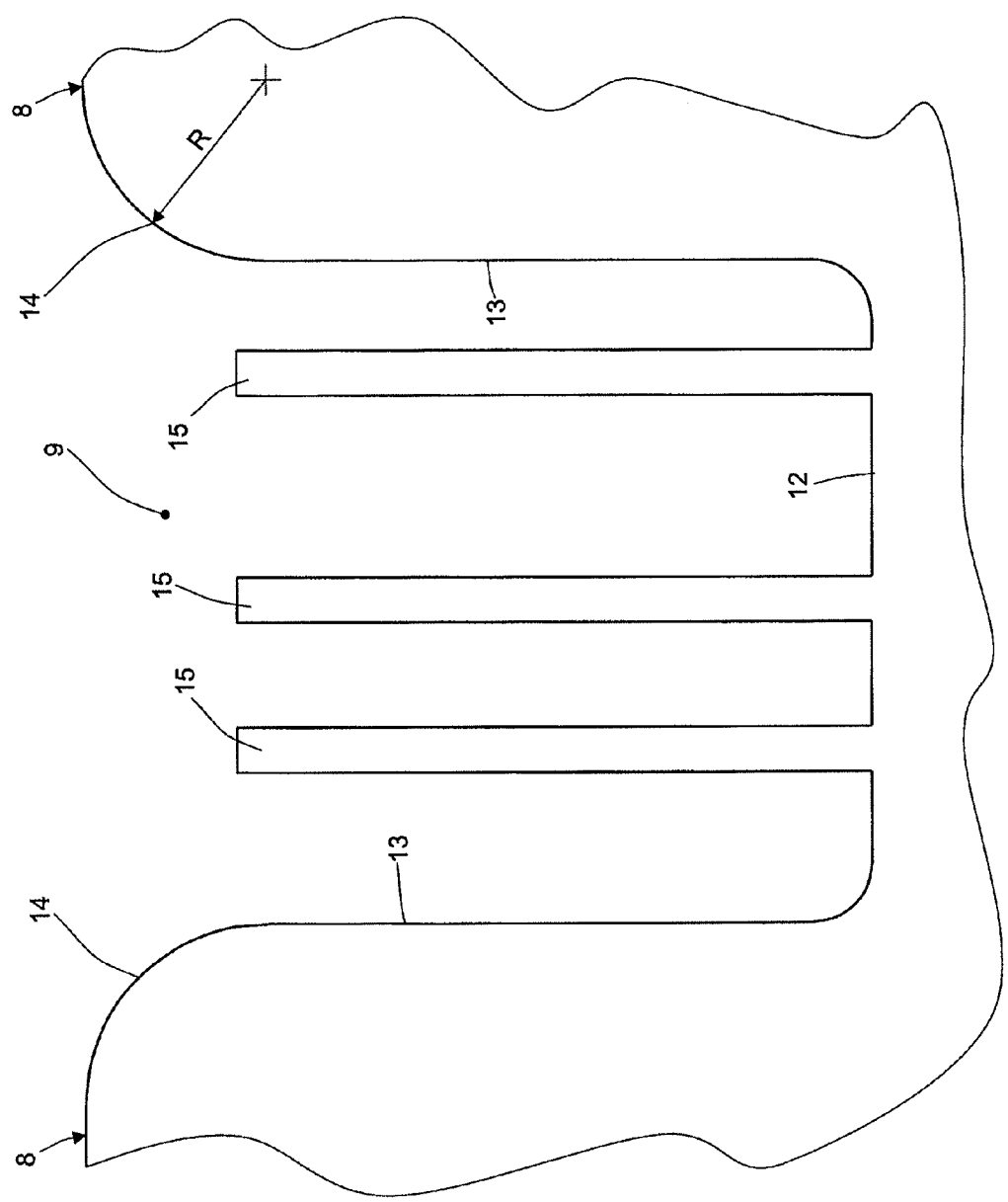

In the FIG. 7 embodiment, each edge 14 is rounded smoothly, in particular with a circular (i.e. quarter-circle-shaped) cross section. Rounding the top edges 14 of longitudinal grooves 9 (and blocks 11) attenuates noise emissions as tyre 1 rolls along the road surface, but combining this with pins 15 has a surprisingly synergic effect, resulting in total noise emission attenuation far superior to that produced individually by pins 15 and rounded edges 14. Tests show that pins 15 provide for attenuating noise emissions by 0.3-0.6 dB(A), and rounded edges 14 for attenuating noise emissions by 0.2-0.3 dB(A), whereas combining the two provides for attenuating noise emissions by 0.7-1.0 dB(A), i.e. by a far greater amount that the mere sum of the attenuations produced individually by pins 15 and rounded edges 14.

Pins 15 attenuate propagation of longitudinal 800-1300 Hz sound waves along longitudinal grooves 9, while rounding edges 14 attenuates over 1300 Hz sound waves, which, not propagating longitudinally, repeatedly strike the walls of longitudinal grooves 9, and are attenuated if reflected from the walls into the funnel formed by the rounded edges. The synergic effect produced by combining pins 15 and rounded edges 14 is due to the longitudinal waves diverted laterally by pins 15 being attenuated by rounded edges 14.

To maximize positive interaction between rounded edges 14 and pins 15, the radius R of each edge 14 must range between 40 and 85% of the length of pins 15, and therefore normally ranges between 3 and 5 mm.

Figure 8:
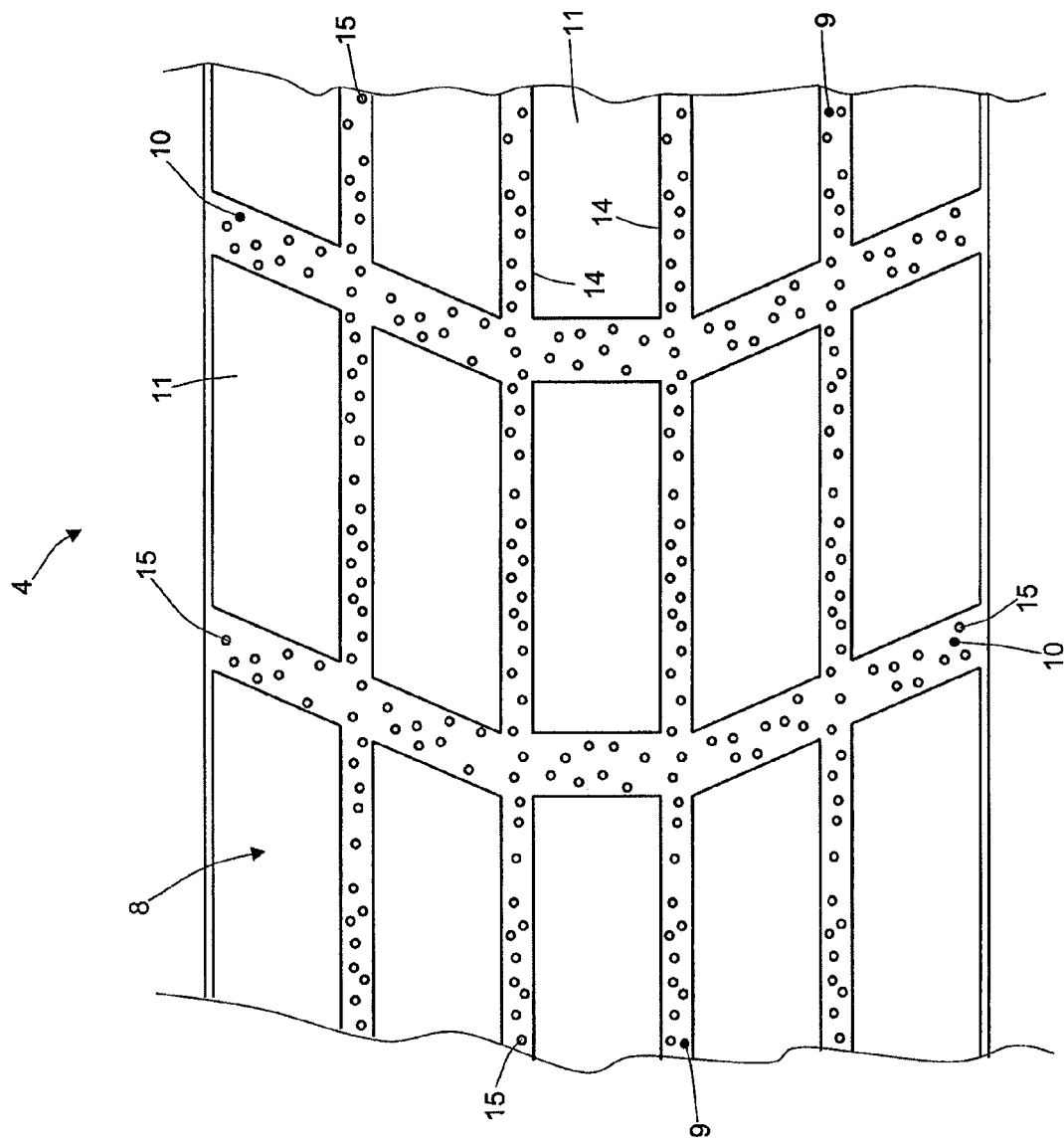
FIG. 8 shows a schematic, larger-scale plan view of a portion of the FIG. 1 tyre tread strip in accordance with a further variation.

In the FIG. 2 embodiment, pins 15 are only provided in longitudinal grooves 9. In a different embodiment shown in FIG. 8, pins 15 are also provided in transverse grooves 10, but are much more effective in longitudinal grooves 9. The lesser effectiveness of pins 15 in transverse grooves 10 is due to transverse grooves 10 extending crosswise to the rolling direction of tyre 1, being much shorter than longitudinal grooves 9, and so housing negligible stationary pressure waves.

In a conventional embodiment, tread strip 4 is made of one rubber-based material, which therefore also forms pins 15. In an alternative embodiment, tread strip 4 is made of a first rubber-based material, which forms most of tread strip 4, and a second rubber-based material, different from the first, which is located at grooves 9 and 10 and forms at least bottom walls 12 of grooves 9 and 10, and pins 15 extending upwards from bottom walls 12. The second rubber-based material is typically softer than the first, to make pins 15 more flexible and more elastically deformable, and to improve noise emission attenuation performance as tyre 1 rolls along the road surface.

Figure 14:
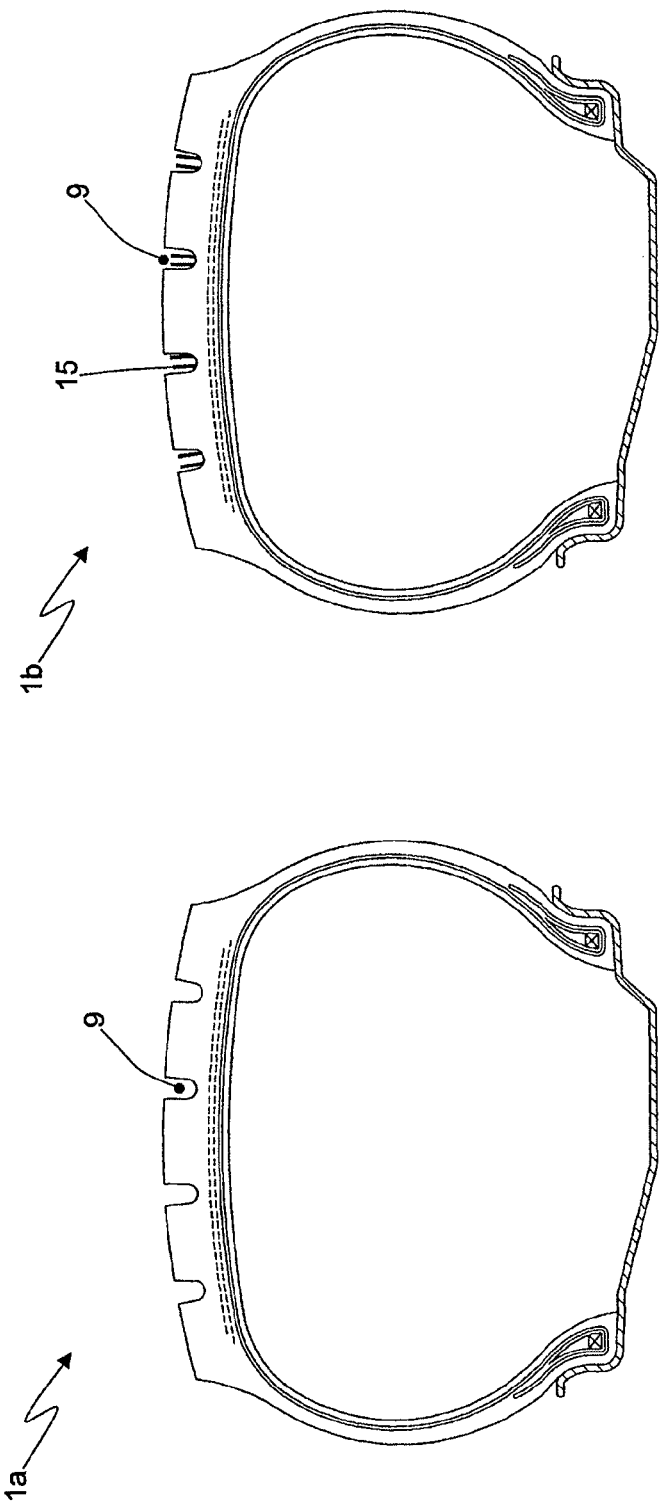
FIG. 14 shows a schematic of two identical test tyres, one without pins, and the other with pins in the longitudinal grooves.

FIGS. 15-18 show comparative test result graphs of the noise levels of tyre 1a on the left in FIG. 14, featuring a tread strip 4 with no pins, and tyre 1b on the right in FIG. 14, featuring a tread strip 4 with pins 15 in longitudinal grooves 9. Apart from the presence or absence of pins 15 in longitudinal grooves 9, tyres 1a and 1b are perfectly identical, so any difference between the two can be attributed to the pins in tyre 1b.

Figure 15:
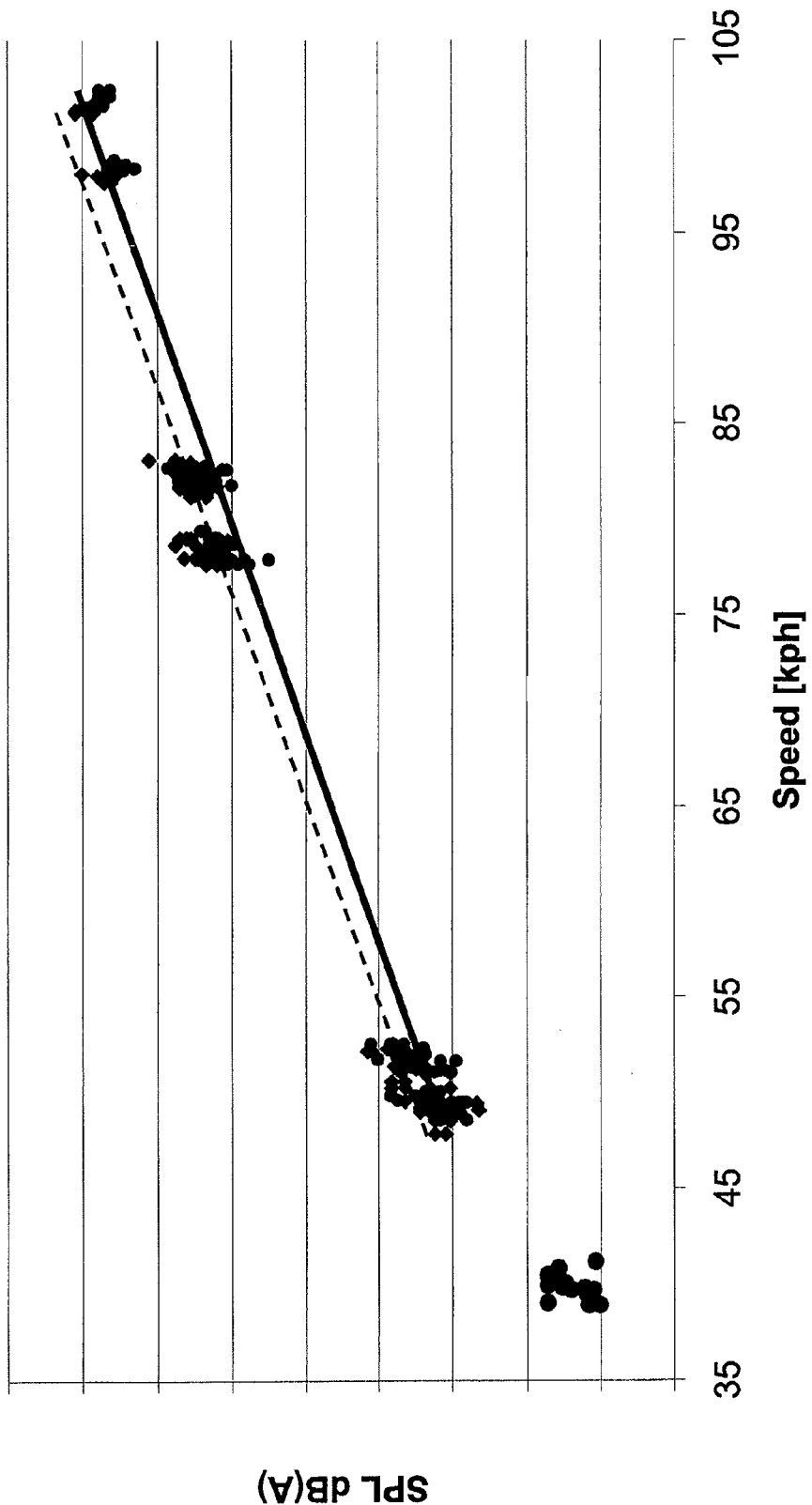
FIGS. 15-18 show comparative test result graphs of the noise levels of the FIG. 14 tyres.

In FIG. 15, the continuous line shows the noise level of tyre 1b with pins 15, and the dash line the noise level of tyre 1a with no pins 15, alongside variations in travelling speed. As can be seen, pins 15 provide for reducing noise by roughly 0.5-0.8 dB(A) at 80 km/h speed. It is important to note that the noise reduction by pins 15 decreases with travelling speed, and falls off altogether (i.e. pins 15 cease to have any appreciable effect) below 40 km/h speed.

Figure 16:
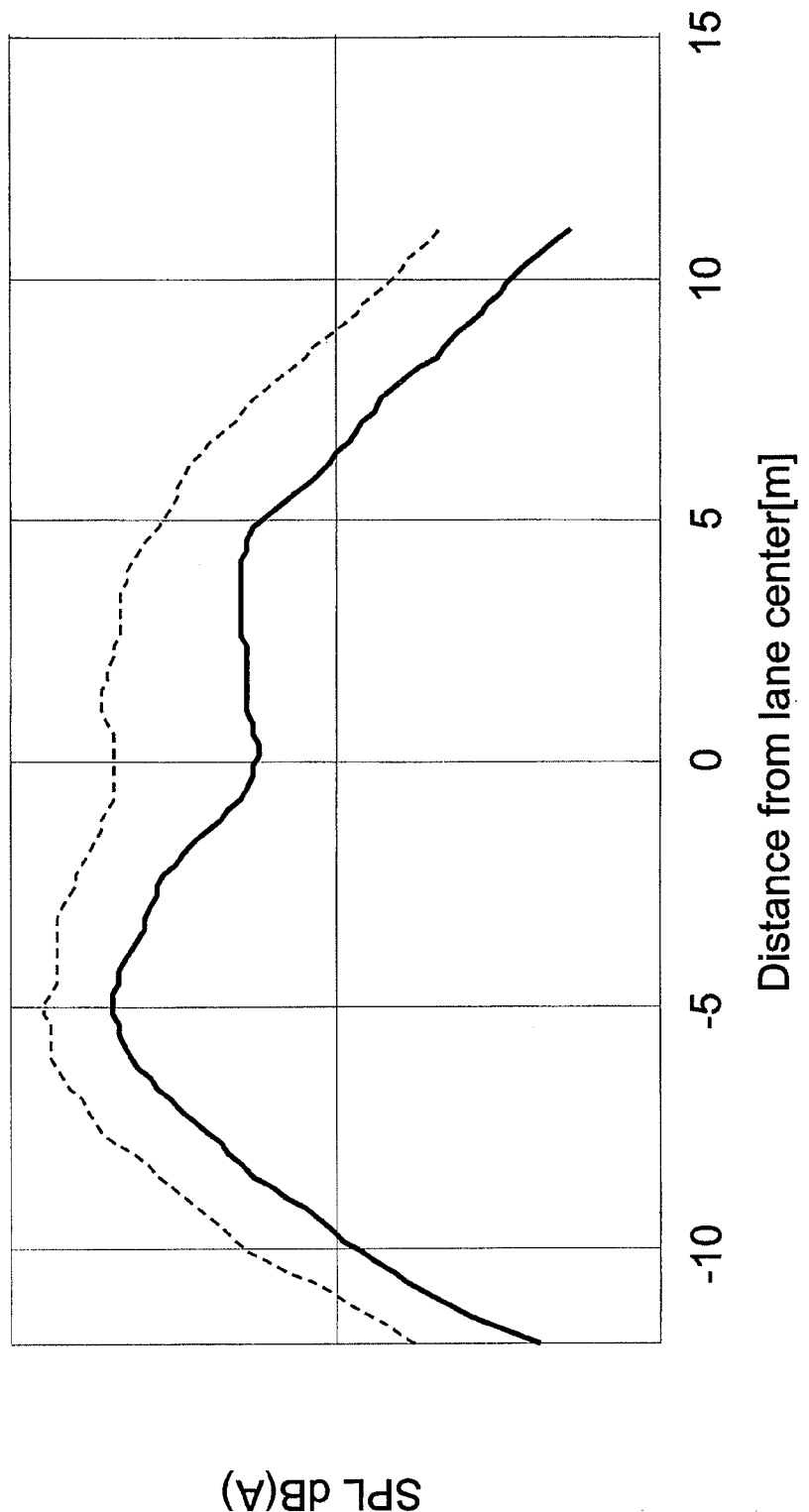

In FIG. 16, the continuous line shows the noise level of tyre 1b with pins 15, and the dash line the noise level of tyre 1a with no pins 15, at constant 80 km/h travelling speed. As can be seen, pins 15 provide for reducing noise by roughly 0.6 dB(A) at 80 km/h speed.

Figure 17:
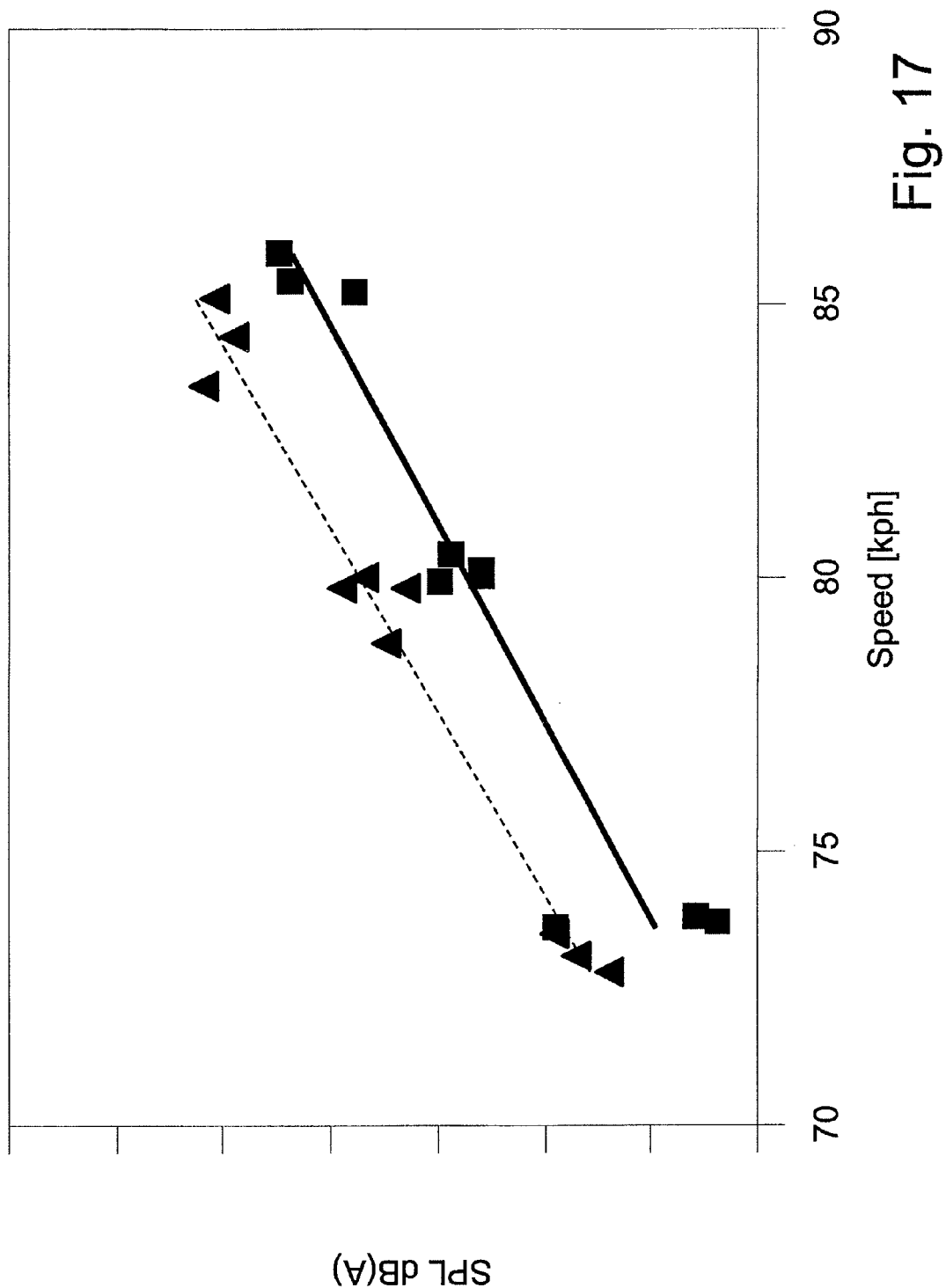
Figure 18:
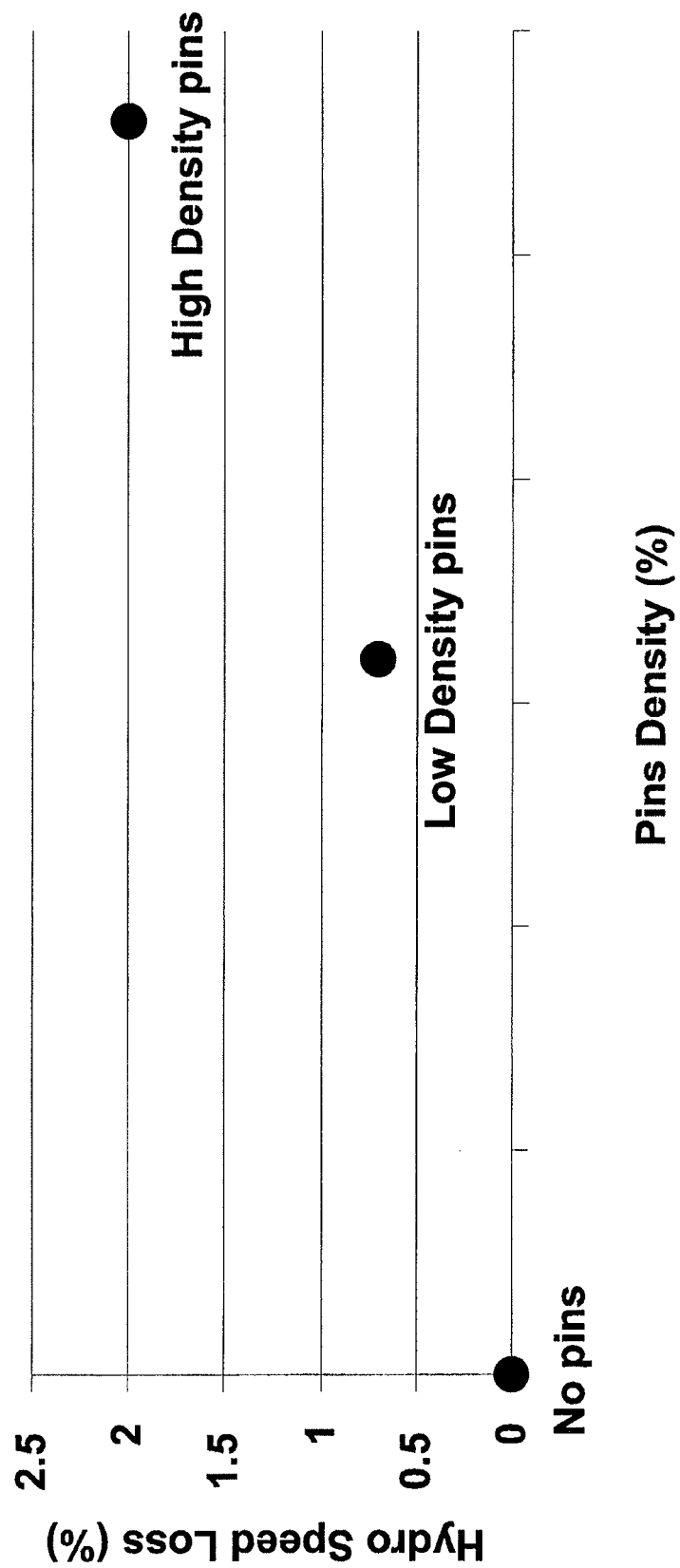

In FIG. 17, the continuous line shows the noise level of tyre 1b with pins 15, and the dash line the noise level of tyre 1a with no pins 15, alongside variations in travelling speed. As can be seen, pins 15 provide for reducing noise by roughly 0.5-0.8 dB(A) at 80 km/h speed.

Tests show that the noise reduction by pins 15 increases with the density of pins 15: at 80 km/h travelling speed, fewer pins 15 (low pin 15 density) reduce noise by roughly 0.4 dB(A), whereas a larger number of pins 15 (high pin 15 density) reduce noise by roughly 0.6 dB(A). The FIG. 18 graph shows the effect of pins 15 on wet-pavement performance of tyre 1: using the wet-pavement cornering speed of tyre 1a with no pins 15 as a reference, wet-pavement cornering speed is reduced by less than 1% by tyre 1b with a low pin 15 density, and by roughly 2% by tyre 1b with a high pin 15 density. It is important to note that pins 15 provide for a 0.4-0.8 dB(A) (i.e. 4-8%) reduction in noise at 80 km/h speed, alongside a 1-2% reduction in wet-pavement performance, i.e. the advantage in terms of noise reduction far outweighs the reduction in wet-pavement performance.

Figure 9:
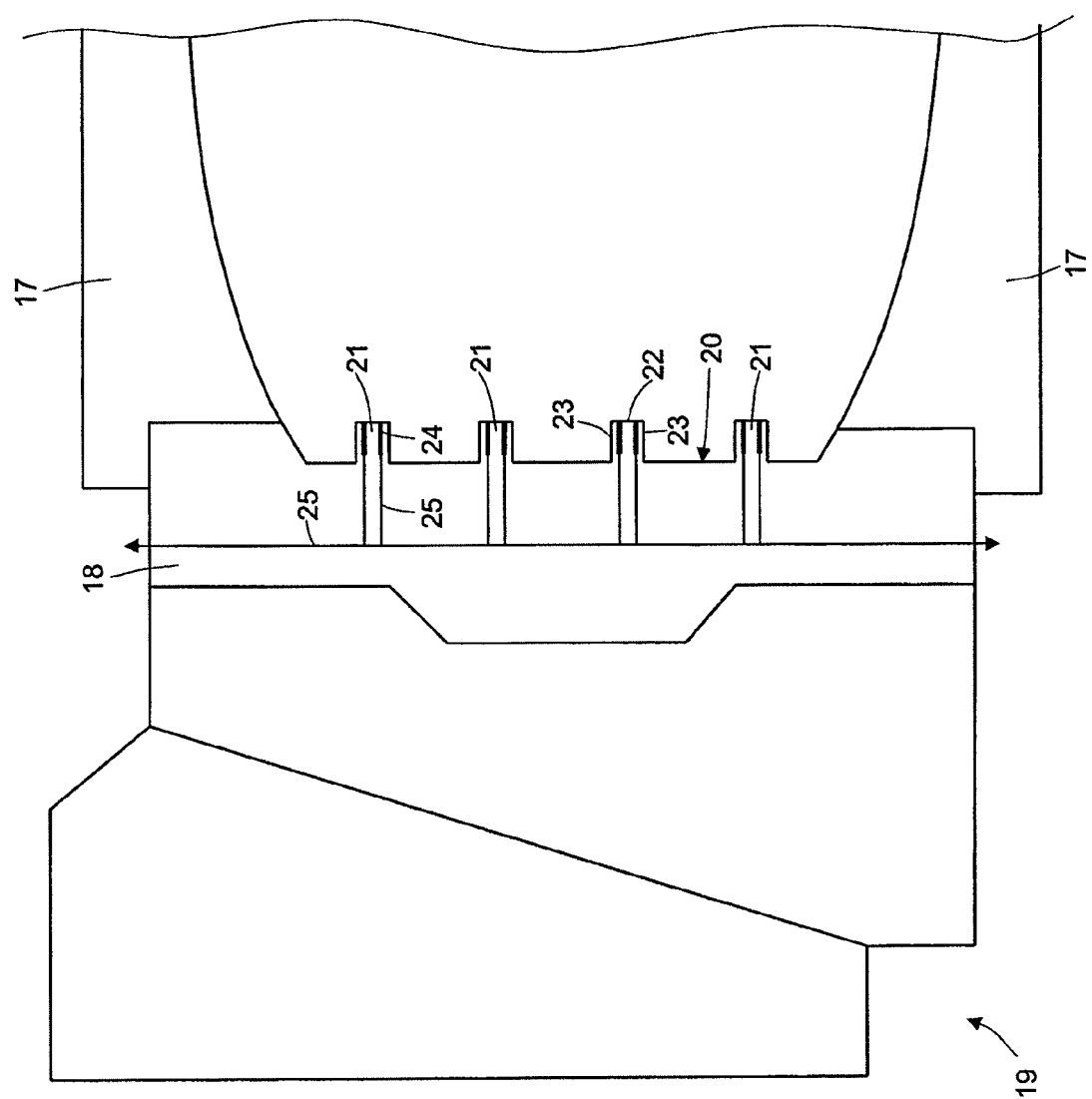
FIG. 9 shows a schematic section of part of a curing mold by which to produce the FIG. 1 tyre.

Number 16 in FIG. 9 indicates as a whole a curing mold for producing the tyre strip 4 described.

Curing mold 16 is in the form of a hollow cylinder, and comprises two opposite, parallel half-molds 17 forming the top and bottom walls of curing mold 16 and having respective inner retaining surfaces contacting a tyre 1 inside the mold. Curing mold 16 also comprises a number of (usually 8 or 9) lateral sectors 18 (only one shown in FIG. 9), which are brought together to form the cylindrical lateral wall of the mold, are movable radially to and from half-molds 17, and are pushed radially towards half-molds 17 by a system 19 of inclined surfaces operated by a press (not shown). This solution is preferred in that it enables lateral sectors 18 to grip half-molds 17 at the 25-30 bar pressure necessary to withstand the normally at least 20 bar pressure generated inside mold 16 during the curing process.

The inner surface 20 of lateral sectors 18 of curing mold 16 negatively reproduces the shape of tread strip 4, and comprises, for each groove 9, 10, a respective projecting member 21, which negatively reproduces the shape of groove 9, 10, and is bounded by an end wall 22, and two lateral walls 23 on opposite sides of end wall 22. Projecting members 21 of curing mold 16 forming longitudinal grooves 9 have holes 24, each of which originates from end wall 22 of projecting member 21 and negatively reproduces the shape of a pin 15.

When the rubber-based material is inserted inside curing mold 16 (after first being looped about body ply 2), the pressure inside mold 16 during the pressure curing process pushes part of the rubber-based material inside holes 24 to form pins 15. In other words, during the pressure curing process, each hole 24 is filled with rubber-based material to form a pin 15 projecting from bottom wall 12 of longitudinal groove 9.

Each hole 24 may be closed, i.e. completely isolated from the outside; in which case, it cannot be filled completely with rubber-based material, on account of the small amount of air inevitably trapped in the end of hole 24. Alternatively, each hole 24 may communicate with the outside along a bleed duct 25 originating from end wall 22 of hole 24; in which case, hole 24 can be filled completely with rubber-based-material, by gradually expelling air from hole 24 along bleed duct 25.

In the above embodiment, tread strip 4 is pressure cured inside a round curing mold 16, after being looped about body ply 2. In an alternative embodiment, tread strip 4 is pressure cured on its own inside a flat curing mold 16; and only later is the precured tread (PCT) strip 4 looped about body ply 2, in the same way, for example, as when retreading tyres.

Tread strip 4 described has numerous advantages.

In particular, noise emissions, as tread strip 4 rolls along the road surface, are greatly reduced, as compared with an identical tread strip 4 with no pins 15.

Having no appreciable effect on wet-pavement draining performance of grooves 9 or 10, pins 15 in grooves 9 or 10 in no way affect wet-pavement performance of tread strip 4. This is an important characteristic, in that it allows existing tread strips 4 to be modified by simply inserting pins 15, with no alterations to the pattern of grooves 9 and 10.

Pins 15 are relatively strong, have little contact with the road surface as the tyre rolls along (at least as long as tread strip 4 is not too badly worn), are therefore subjected to no mechanical stress, and so remain intact even after prolonged use.

Last but not least, pins 15 are cheap and easy to produce, by simply forming holes 24 in curing mold 16; which means existing curing molds 16 can be modified easily, as opposed to providing new ones.

The invention claimed is:

1. A tread strip made of at least one rubber-based material, comprising:
    at least one longitudinal groove bounded by a bottom wall and by two lateral walls on opposite sides of the bottom wall; and
    a number of pins, each of which projects from at least one wall of the longitudinal groove, is a seamless outgrowth of the wall of the longitudinal groove, and is made seamlessly of the same rubber-based material as the tread strip;
    wherein the pins are distributed randomly along the longitudinal groove, so the pins as a whole do not form a regular structure, and
    wherein the pins cover 0.45% to 25% of the total surface area of each wall of the longitudinal groove.

2. The tread strip as claimed in claim 1, wherein the longitudinal distances between consecutive pins are randomly distributed.

3. The tread strip as claimed in claim 2, wherein the longitudinal distances between consecutive pins comprise a large number of different longitudinal distances with no multiple/submultiple relationship.

4. The tread strip as claimed in claim 1, wherein the longitudinal distances between consecutive pins are assumed to be randomly distributed when the longitudinal distances have at least two occurrence frequencies in the set defined as follows:

$$\theta_0 = 2 \cdot D_{PIN}/D_{TYRE}$$

$$\theta_i = i \cdot \theta_0$$

$$n_i = \text{occurrence between } \theta_i \text{ and } \theta_{i+1}$$

$$A = \{n_i : n_i \in [1, 2\pi/(\Theta_{i+1} \cdot K]; i=1, 2, \ldots, \alpha_{FP}/(2 \cdot \theta_0)\}$$

$D_{PIN}$ diameter of a pin;
$D_{TYRE}$ diameter of the tyre;
$\alpha_{FP}$ footprint angle;
K safety coefficient greater than one.

5. The tread strip as claimed in claim 1, wherein, in each footprint of the tread strip the pins in the longitudinal groove are distributed so that, when viewed longitudinally, the pins as a whole cover at least 80% of the cross section of the longitudinal groove.

6. The tread strip as claimed in claim 1, wherein the circular cross section of each pin has a diameter of 0.3 to 1.2 mm.

7. The tread strip as claimed in claim 1, wherein the pins projecting from the bottom wall of the longitudinal groove are of a length ranging between 60% and 90% of the depth of the longitudinal groove.

8. The tread strip as claimed in claim 1, wherein the pins in the longitudinal groove occupy a volume no greater than 10% of the total volume of the longitudinal groove.

9. The tread strip as claimed in claim 1, wherein the pins form an angle of other than at the point of attachment to the wall of the longitudinal groove from which they project.

10. The tread strip as claimed in claim 1, wherein the pins projecting from the lateral walls of the longitudinal groove all originate from an area ranging between the bottom wall and half the overall depth of the longitudinal groove.

11. The tread strip as claimed in claim 1, wherein at least one pin is other than straight.

12. The tread strip as claimed in claim 1, and comprising a number of longitudinal grooves, and a number of transverse grooves intersecting the longitudinal grooves; the pins being provided in both the longitudinal grooves and the transverse grooves.

13. The tread strip as claimed in claim 1, wherein the two lateral walls of the longitudinal groove form two corresponding edges with a rolling surface; each edge being rounded with no sharp edges.

14. The tread strip as claimed in claim 13, wherein each edge is rounded with a circular cross section.

15. The tread strip as claimed in claim 13, wherein each edge is rounded with a radius ranging between 40% and 85% of the length of the pins.

16. The tread strip as claimed in claim 13, wherein each edge is rounded with a radius of 3 to 5 mm.

17. The tread strip as claimed in claim 1, and made of a first rubber-based material that forms most of the tread strip; and a second rubber-based material, that is different from the first material, is located at the longitudinal groove, and forms at least one wall of the longitudinal groove, and the pins projecting from that wall.

18. A tyre comprising a toroidal body ply, which has two beads and supports the tread strip wound about the body ply and as claimed in claim 1.

19. The tread strip as claimed in claim 1, wherein, in each footprint of the tread strip, the pins in the longitudinal groove are distributed so that, when viewed longitudinally, the pins as a whole cover 100% of the cross section of the longitudinal groove.

20. A tread strip made of at least one rubber-based material, and comprising:
   at least one longitudinal groove bounded by a bottom wall and by two lateral walls on opposite sides of the bottom wall; and
   a number of pins, each of which projects from at least one wall of the longitudinal groove, is a seamless outgrowth of the wall of the longitudinal groove, and is made seamlessly of the same rubber-based material as the tread strip;
   wherein the pins are distributed randomly along the longitudinal groove, so the pins as a whole do not form a regular structure, and
   wherein the longitudinal distances between consecutive pins are assumed to be randomly distributed when the longitudinal distances have at least two occurrence frequencies in the set defined as follows:

$\theta_0 = 2 \cdot D_{PIN}/D_{TYRE}$ $\theta_i = i \cdot \theta_0$ $n_i$=occurrence between $\theta_i$ and $\theta_{i+1}$ $A = \{n_i : n_i \in [1, 2\pi/(\Theta_{i+1} \cdot K]; i=1, 2, \ldots, \alpha_{FP}/(2 \cdot \theta_0)\}$ $D_{PIN}$ diameter of a pin;
   $D_{TYRE}$ diameter of the tyre;
   $\alpha_{FP}$ footprint angle;
   K safety coefficient greater than one.

21. A tread strip made of at least one rubber-based material, and comprising:
   at least one longitudinal groove bounded by a bottom wall and by two lateral walls on opposite sides of the bottom wall; and
   a number of pins, each of which projects from at least one wall of the longitudinal groove, is a seamless outgrowth of the wall of the longitudinal groove, and is made seamlessly of the same rubber-based material as the tread strip;
   wherein the pins are distributed randomly along the longitudinal groove, so the pins as a whole do not form a regular structure, and
   wherein the pins form an angle of other than 90° at the point of attachment to the wall of the longitudinal groove from which they project.

22. A tread strip made of at least one rubber-based material, and comprising:
   at least one longitudinal groove bounded by a bottom wall and by two lateral walls on opposite sides of the bottom wall; and
   a number of pins, each of which projects from at least one wall of the longitudinal groove, is a seamless outgrowth of the wall of the longitudinal groove, and is made seamlessly of the same rubber-based material as the tread strip;
   wherein the pins are distributed randomly along the longitudinal groove, so the pins as a whole do not form a regular structure, and
   wherein the pins projecting from the lateral walls of the longitudinal groove all originate from an area ranging between the bottom wall and half the overall depth of the longitudinal groove.

23. A tread strip made of at least one rubber-based material, and comprising:
   at least one longitudinal groove bounded by a bottom wall and by two lateral walls on opposite sides of the bottom wall; and
   a number of pins, each of which projects from at least one wall of the longitudinal groove, is a seamless outgrowth of the wall of the longitudinal groove, and is made seamlessly of the same rubber-based material as the tread strip;
   wherein the pins are distributed randomly along the longitudinal groove, so the pins as a whole do not form a regular structure, and
   wherein the two lateral walls of the longitudinal groove form two corresponding edges with a rolling surface; each edge being rounded with no sharp edges.

24. The tread strip as claimed in claim 23, wherein each edge is rounded with a circular cross section.

25. The tread strip as claimed in claim 23, wherein each edge is rounded with a radius ranging between 40% and 85% of the length of the pins.

26. The tread strip as claimed in claim 23, wherein each edge is rounded with a radius of 3 to 5 mm.

* * * * *